United States Patent
Sarkar et al.

(10) Patent No.: US 9,485,135 B1
(45) Date of Patent: Nov. 1, 2016

(54) NODE-PROTECTION AND PATH ATTRIBUTE COLLECTION WITH REMOTE LOOP FREE ALTERNATES

(71) Applicant: Juniper Networks, Inc., Sunnyvale, CA (US)

(72) Inventors: Pushpasis Sarkar, Bangalore (IN); Hannes Gredler, Pillberg (AT); Shraddha Hegde, Bangalore (IN); Harish Raghuveer, Bangalore (IN)

(73) Assignee: Juniper Network, Inc., Sunnyvale, CA (US)

( * ) Notice: Subject to any disclaimer, the term of this patent is extended or adjusted under 35 U.S.C. 154(b) by 254 days.

(21) Appl. No.: 14/042,621

(22) Filed: Sep. 30, 2013

(51) Int. Cl.
*H04L 12/24* (2006.01)

(52) U.S. Cl.
CPC .................... *H04L 41/0654* (2013.01)

(58) Field of Classification Search
CPC ....... H04L 45/00; H04L 45/12; H04L 45/50; H04L 45/28; H04L 45/22; H04L 41/0654; H04L 12/18; H04L 12/24; H04L 12/26; H04L 45/02; H04L 45/16; H04L 45/66; H04L 45/48
USPC ........................................................ 370/225
See application file for complete search history.

(56) References Cited

U.S. PATENT DOCUMENTS

2015/0016242 A1* 1/2015 Ernstrom et al. ............. 370/218

OTHER PUBLICATIONS

Litkowski et al., "Operational management of Loop Free Alternates," draft-ietf-rtgwg-lfa-manageability-00, Internet-draft, May 13, 2013, 16 pp.

Bryant et al., "Remote LFA FRR," draft-ietf-rtgwg-remote-lfa-01, Internet-Draft, Dec. 19, 2012, 14 pp.
Litkowski, "Node protecting remote LFA," draft-litkowski-rtgwg-node-protect-remote-lfa-00, Internet-Draft, Apr. 2, 2013, 7 pp.
Atlas, "Basic Specification for IP Fast Reroute: Loop-Free Alternates," RFC 5286, Network Working Group, Sep. 2008, 32 pp.
Moy, "OSPF Version 2," RFC 2328, Network Working Group, Apr. 1998, 204 pp.
Callon, "Use of OSI IS-IS for Routing in TCP/IP and Dual Environments," RFC 1195, Network Working Group, Dec. 1990, 80 pp.
Simpson, "IP in IP Tunneling," RFC 1853, Network Working Group, Oct. 1995, 8 pp.
Hanks, "Generic Routing Encapsulation (GRE)," RFC 1701, Network Working Group, Oct. 1994, 8 pp.
Andersson, "LDP Specification," RFC 5036, Network Working Group, Oct. 2007, 135 pp.

* cited by examiner

*Primary Examiner* — Ricky Ngo
*Assistant Examiner* — Richard Chang
(74) *Attorney, Agent, or Firm* — Shumaker & Sieffert, P.A.

(57) ABSTRACT

An example method includes selecting, by a network device, a remote LFA next hop as an alternate next hop for forwarding network traffic from the network device to a destination, wherein the selected remote LFA next hop provides node protection to a primary next hop node on the shortest path from the network device to the destination. The method includes, for each candidate remote LFA next hop, performing a forward shortest path first (SPF) computation having the respective candidate remote LFA next hop as a root to compute a path segment between the respective candidate remote LFA next hop and the destination, wherein each of the candidate remote LFA next hops is the egress of a respective potential repair tunnel between the network device and candidate remote LFA next hop, and selecting the remote LFA next hop based at least in part on the computed path segments.

18 Claims, 6 Drawing Sheets

NODE-PROTECTION AND PATH ATTRIBUTE COLLECTION WITH REMOTE LOOP FREE ALTERNATES

TECHNICAL FIELD

The invention relates to computer networks and, more particularly, to forwarding network traffic within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol.

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols such as OSPF and IS-IS may take a long time to adapt their forwarding tables in response to the topological change resulting from node and link failures in the network. The process of adapting the forwarding tables is known as convergence. This time delay occurs because recovery from a failure requires each node to re-compute the shortest path algorithm to calculate the next hop for the affected nodes in the network. Until the next hops are re-computed, traffic being sent toward the failed links may be dropped. Current deployments take time in the order of 500 milliseconds to several seconds for detection and recovery from failures in the network. These large convergence times may adversely affect the performance of Voice over Internet Protocol (VoIP) and multimedia applications, which are extremely sensitive to traffic loss. Service providers are demanding end-to-end failure detection and recovery times to be less than 50 milliseconds.

One approach to reduce failure recovery time is to select an alternate next-hop in addition to the best next-hop for a destination. Along with the best next-hop, the alternate next-hop is installed in the packet forwarding component. When a link failure occurs, the router uses the alternate next-hop for packet forwarding until the shortest path algorithm has re-computed the next hops for the updated network topology and installed the re-computed next hops in the packet forwarding component. A basic remote LFA repair mechanism can be used, in which tunnels are used to provide additional logical links which can then be used as loop free alternates where none exist in the original topology.

SUMMARY

In general, the techniques of this disclosure provide improved convergence of routing tables, such as those implemented when using link state routing protocols such as the Open Shortest Path First (OSPF) protocol and the Intermediate-System to Intermediate System (IS-IS) protocol, after a network fault, such as link failure. Specifically, techniques are described for improved methods of identifying remote loop-free alternate next hops to provide local protection for network traffic in Internet Protocol (IP) networks in the event of a topology change due to a failure. Pre-calculated remote loop-free alternate next hops can be used for forwarding network traffic until the convergence process completes. This disclosure describes procedures for determining whether a given PQ-node provides node-protection for a specific destination. The disclosure also describes using the same procedure for collection of complete characteristics for alternate paths.

In one aspect, a method includes by the network device, for each of a plurality of candidate remote loop-free alternate (LFA) next hops, performing a respective forward shortest path first (SPF) computation having the respective candidate remote LFA next hop as a root to compute a respective path segment between the respective candidate remote LFA next hop and a destination network device in a network, wherein each of the candidate remote LFA next hops comprises the tail-end node of a respective potential repair tunnel between the network device and the candidate remote LFA next hop for forwarding network traffic from the network device to the destination network device, and selecting, by the network device and based at least in part on the computed path segments, a remote LFA next hop from the plurality of candidate remote LFA next hops to be stored as an alternate next hop for forwarding network traffic from the network device to the destination network device, wherein the selected remote LFA next hop provides node protection to a primary next hop node on the shortest path from the network device to the destination device. The method also includes updating, by the network device, forwarding information stored by the network device to install the selected remote LFA next hop as the alternate next hop for forwarding network traffic from the network device to the destination network device.

In another aspect, a network device includes a control unit configured to execute a link-state routing protocol for exchanging link-state routing information to maintain network topology for a network, a physical interface configured to send and receive link-state routing updates in accordance with the link-state routing protocol, and a route selection module configured to, for each of a plurality of candidate remote loop-free alternate (LFA) next hops identified based on the network topology, perform a respective forward shortest path first (SPF) computation having the respective candidate remote LFA next hop as a root to compute a respective path segment between the respective candidate remote LFA next hop and a destination network device in the network, wherein each of the candidate remote LFA next hops comprises the tail-end node of a respective potential repair tunnel between the network device and the candidate remote LFA next hop for forwarding network traffic from the network device to the destination network device. The route selection module is configured to select, based at least in part on the computed path segments, a remote LFA next hop from the plurality of candidate remote LFA next hops to be stored as an alternate next hop for forwarding network traffic from the network device to the destination network device, wherein the selected remote LFA next hop provides node protection to a primary next hop node on the shortest path from the network device to the destination device; and wherein the route selection module is configured to update forwarding information stored by the network device to install the selected remote LFA next hop as the alternate next hop for forwarding network traffic from the network device to the destination network device.

In another aspect, a computer-readable storage medium includes instructions. The instructions cause a programmable processor of a network device to for each of a plurality of candidate remote loop-free alternate (LFA) next hops, perform a respective forward shortest path first (SPF) computation having the respective candidate remote LFA next hop as a root to compute a respective path segment between the respective candidate remote LFA next hop and a destination network device in a network, wherein each of the candidate remote LFA next hops comprises the tail-end node of a respective potential repair tunnel between the network device and the candidate remote LFA next hop for forwarding network traffic from the network device to the destination network device; select, based at least in part on the computed path segments, a remote LFA next hop from the plurality of candidate remote LFA next hops to be stored as an alternate next hop for forwarding network traffic from the network device to the destination network device, wherein the selected remote LFA next hop provides node protection to a primary next hop node on the shortest path from the network device to the destination device; and update forwarding information stored by the network device to install the selected remote LFA next hop as the alternate next hop for forwarding network traffic from the network device to the destination network device.

The techniques of this disclosure may provide one or more advantages. For example, the techniques may reduce packet loss that can occur during router convergence after a failure. In addition, the number of additional SPFs required in the proposed mechanism in this disclosure will likely be considerably less compared to the procedures outlined in other approaches, and imply less computational overhead. In systems where all routing functionality is implemented in a single daemon, it may be problematic when SPF computations are time-consuming, because all other routing functionality is blocked until the LFA next hop computation is completed. Thus, reducing the computation time required for computing the LFA next hop can result in a faster return by the routing protocol daemon to other routing functionality. This may be particularly useful in circumstances where the type of network traffic is sensitive to packet loss.

As another example, the additional forward SPF for each PQ-node, as proposed in this disclosure, allows for collecting the path characteristics for the alternate path segment from the PQ-node to the destination. This knowledge about the characteristics of all alternate paths can be used in turn for applying operator defined policies for eliminating paths not fitting constraints. This ability to collect path characteristics for alternate path segments is not demonstrated by other alternative R-LFA computation proposals.

The details of one or more examples are set forth in the accompanying drawings and the description below. Other features, objects, and advantages will be apparent from the description and drawings, and from the claims.

DETAILED DESCRIPTION

Figure 1:
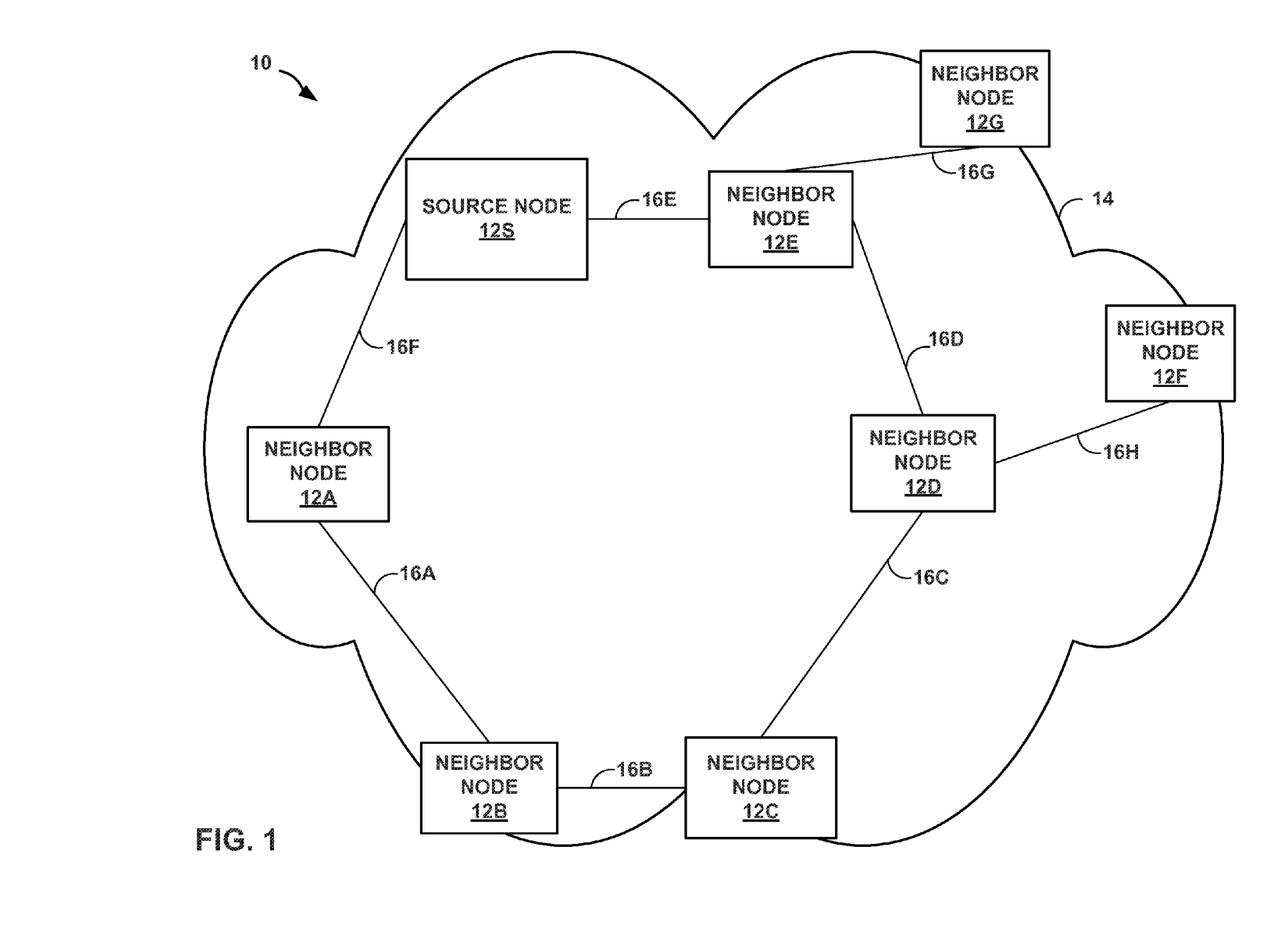
FIG. 1 is a block diagram illustrating an example network that includes network devices configured to employ the techniques described herein for selecting a remote loop-free alternate (R-LFA) next hop.

FIG. 1 is a block diagram illustrating a system 10 that includes an example network 14 having network devices 12A-12S (network devices or "nodes" 12) configured to employ the techniques described herein for selecting a remote loop-free alternate (R-LFA) next hop for use in Internet Protocol (IP) fast reroute of network traffic upon a primary next hop becoming unavailable. Network devices 12 may use the techniques described herein to accelerate convergence of routing information after a network fault.

Network devices 12 may be routers, and may use a link-state routing protocol, such as the Open Shortest Path First (OSPF) protocol or the Intermediate-System to Intermediate System (IS-IS) protocol, to exchange link-state routing information to learn the topology of network 14. Although shown for simplicity and purposes of example as including network devices 12A-12G, network 14 may include additional network devices (not shown). Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

Each of network devices 12 may calculate next hops to be used to reach other network devices 12 in network 14 based on the link-state routing information exchanged using a link-state routing protocol, and may install the calculated next hops in stored forwarding information for forwarding network traffic destined for the other nodes. These next hops may be referred to as "primary next hops." The primary next hops are used for forwarding network traffic in the absence of any detected network failures. In accordance with the principles of this disclosure, network devices 12 may also be configured to calculate and install alternate next hops for each destination node, for use in forwarding network traffic if a failure is detected on a link or node associated with the respective primary next hop.

From the perspective of source node 12S, a primary path for sending network traffic to neighbor node 12F may be selected to go through neighbor node 12E, for example. Source node 12S may select a primary next hop, such as a next hop along the shortest path to the destination neighbor node 12F, i.e., along the path having the lowest total cost associated with all of the links traversed. In the example of FIG. 1, source node 12S may select neighbor node 12E as the primary next hop to use for sending traffic to destination neighbor node 12F because neighbor node 12E is the next hop along the shortest path to destination neighbor node 12F, i.e., along the path having the lowest total cost associated with all of the links traversed. Source node 12S may also select an alternate next hop to use for reaching neighbor node 12F, for use in the event of a failure associated with neighbor node 12E (e.g., a failure of link 16E, a failure of neighbor node 12E itself, or other failure). As with LFA fast reroute (FRR), when a router detects an adjacent link failure, the router may use one or more repair paths in place of the failed link. Repair paths are pre-computed in anticipation of later failures so they can be promptly activated when a failure is detected.

Source node 12S may be configured to select an alternate next hop using the techniques described herein. This disclosure describes procedures for determining whether a given candidate remote LFA next hop provides node-protection for a specific destination, where requested and available. The disclosure also describes using the same procedure for collection of complete characteristics for alternate paths. For LFAs, an alternate next hop selected by source node 12S will be loop-free, meaning that the next hop will not send the traffic to the neighbor node 12F on a path that goes back through source node 12S. The loop-free criterion is needed because if the alternate path passed back through source node 12S, the network traffic would encounter the failure at node 12E and would still be dropped.

Figure 2:
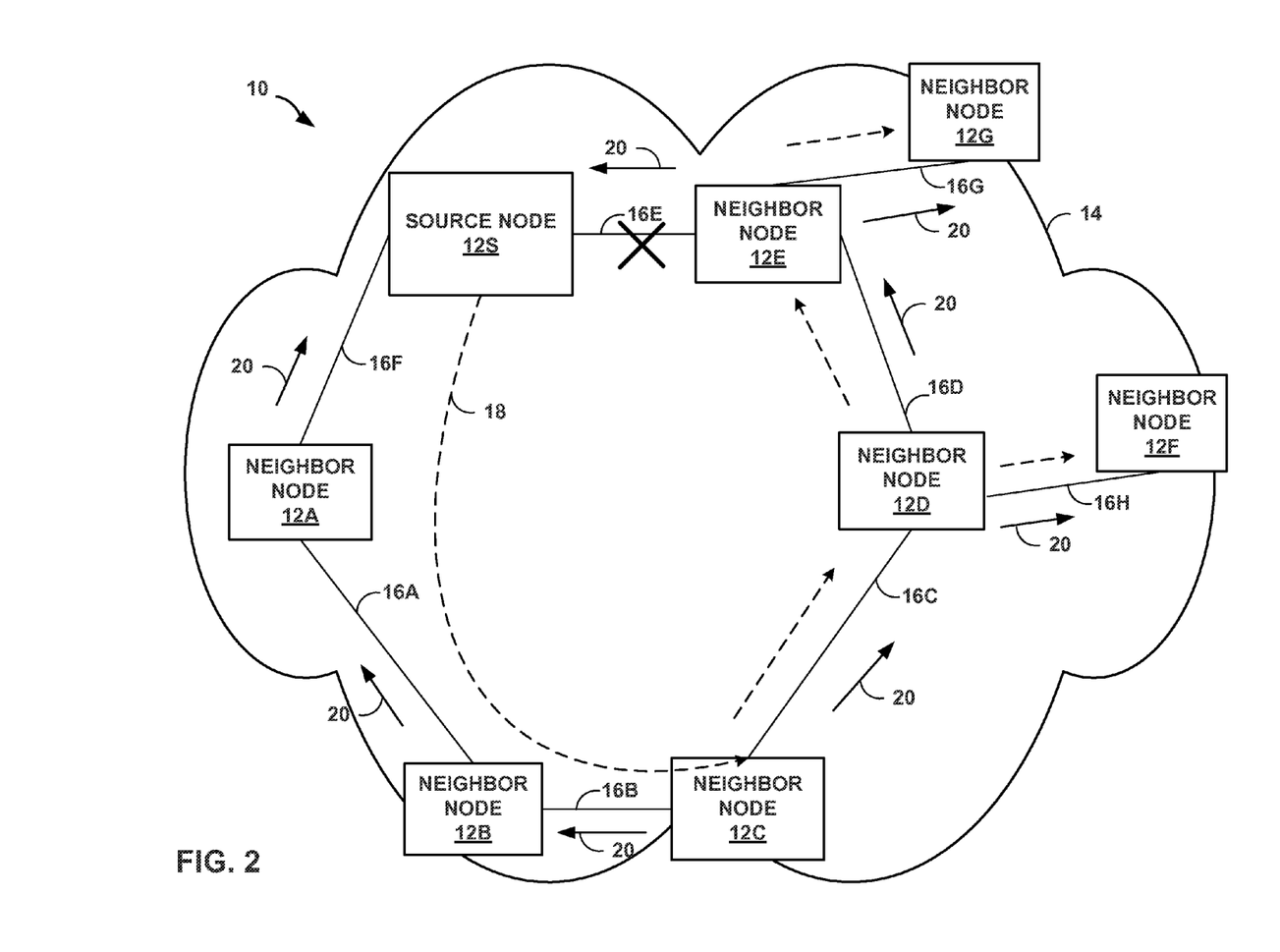
FIG. 2 is a block diagram illustrating an example network having network devices configured to employ the techniques described herein.

FIG. 2 is a block diagram illustrating the example network 14 of FIG. 1 having network devices configured to employ the techniques described herein in the case of a link failure. Traditional LFAs may not provide good protection for some topologies, notably ring based topologies. For example, if all link costs are equal, the link 16E between source node 12S and neighbor node 12E cannot be fully protected by LFAs. The destination neighbor node 12C is an ECMP from source node 12S, and so can be protected when link 16E fails, but neighbor node 12D and neighbor node 12E are not protectable using LFAs.

A basic remote LFA repair mechanism can be used, in which tunnels are used to provide additional logical links which can then be used as loop free alternates where none exist in the original topology. For example, if a tunnel 18 is provided between source node 12S and neighbor node 12C, then neighbor node 12C, now being a direct neighbor of source node 12S by virtue of tunnel 18, would become an LFA for neighbor node 12D and neighbor node 12E. The non-failure traffic distribution is not disrupted by the provision of such a tunnel since it is only used for repair traffic and would not be used for normal traffic.

A tunneled repair path, such as tunnel 18, tunnels traffic to some staging point in the network (e.g., neighbor node 12C) from which it is assumed that, in the absence of multiple failures, the tunneled traffic will travel to its destination using normal forwarding without looping back. This effectively provides a virtual loop-free alternate to supplement the physical loop-free alternates, hence the name "Remote LFA FRR." Thus, in using remote LFA FRR, the protecting router seeks the help of a remote LFA staging point when a link cannot be entirely protected with local LFA neighbors.

Consider an arbitrary protected link S-E. In LFA FRR, if a path to the destination from a neighbor N of S does not cause a packet to loop back over the link S-E (i.e., N is a loop-free alternate), then S can send the packet to N and the packet will be delivered to the destination using the pre-failure forwarding information. If there is no such LFA neighbor, then S may be able to create a virtual LFA by using a tunnel to carry the packet to a point in the network which is not a direct neighbor of S from which the packet will be delivered to the destination without looping back to S. In this document such a tunnel is termed a repair tunnel. The tail-end, or egress node, of this tunnel is called a "remote LFA" or a "PQ node".

Note that the repair tunnel terminates at some intermediate router between source node 12S and neighbor node 12E, and not neighbor node 12E itself. This is clearly the case, since if it were possible to construct a tunnel from source node 12S to neighbor node 12E, then a conventional LFA would have been sufficient to carry out the repair.

This disclosure describes extensions to the basic remote LFA repair mechanism. The techniques of this disclosure are not restricted to use in ring-based topologies, but rather provide general mechanisms which can be used to provide added features to RLFA next hops by ensuring node-protection, where requested and available.

This section defines additional terms used in this disclosure. P-space: P-space is the set of routers (or network devices, generally) reachable from a specific router (S) without any path (including equal cost path splits) transiting the protected link L1. That is, P-space(S, L1) is the set of routers which can be reached from S without traversing the link being protected (L1). P-space can be obtained, for example, by computing a shortest path tree (SPT) rooted at S and excising the sub-tree reached via the link S-E (including those which are members of an ECMP). For example, the P-space of source node 12S, is the set of routers that source node 12S can reach without using the protected link 16E.

Extended P-space is defined as the union of the P-space of the neighbors of a specific router with respect to the protected link. That is, extended P-space(S): P-space(S)+P-space (router other than primary neighbor).

Q-space is defined as the set of routers from which a specific router can be reached without any path (including equal cost path splits) transiting the protected link. Q-space can be obtained, for example, by computing a reverse shortest path tree (rSPT) rooted at E, with the sub-tree which traverses the failed link excised (including those which are members of an ECMP).

PQ node is defined as a node which is a member of both the extended P-space and the Q-space. The set of PQ nodes of S are candidates for the remote LFA node. The Repair tunnel is defined as a tunnel established for the purpose of providing a virtual neighbor which is a Loop Free Alternate. The Remote LFA is defined as the tail-end of a repair tunnel. This tail-end is a member of both the extended-P space and the Q space. It is also termed a "PQ" node.

There are a number of IP in IP tunnel mechanisms that may be used for tunneling traffic through tunnel 18, such as IP-in-IP and Generic Routing Encapsulation (GRE). See W. Simpson, "IP in IP Tunneling," Network Working Group, RFC 1853, October 1995; and S. Hanks, "Generic Routing Encapsulation (GRE)," Network Working Group, RFC 1701, October 1994; the entire contents of each of which being incorporated by reference herein.

In a Multi-Protocol Label Switching (MPLS)-enabled network using the Label Distribution Protocol (LDP), a simple label stack may be used to provide the required repair tunnel 18. In this case, the outer label is source node 12S's neighbor's label for the repair tunnel end point (e.g., a label advertised by neighbor node 12A), and the inner label is the repair tunnel end point's label for the packet destination (e.g., a label advertised by neighbor node 12C). In order for source node 12S to obtain the correct inner label, source node 12S may establish a directed LDP session to the tunnel end point 12C. See L. Andersson, "LDP Specification," Network Working Group, RFC 5036, October 2007, the entire contents of which are incorporated by reference herein.

As shown in FIG. 2, nodes 12 exchange LDP label map messages 20 advertising a label to use for encapsulating traffic for MPLS forwarding in network 14. An LSP 18 from source node 12S to the PQ node is thus readily available in an MPLS-enabled network 14, and hence does not require any new protocol extension or design change. The performance of the encapsulation and decapsulation is straightforward, as encapsulation is just a push of a label (like conventional MPLS traffic-engineering (TE) fast reroute (FRR)) and the decapsulation occurs naturally, e.g., at the penultimate hop before the PQ node.

As shown in FIG. 2, traffic can be forwarded from source node 12S via tunnel 18 (using LDP labels advertised by nodes 12C, 12B, 12A), and then nodes 12C, 12D, and 12E can forward the traffic using conventional forwarding. Forwarded traffic flows on the dashed lines in FIG. 2.

When a failure is detected by source node 12S, source node 12S may redirect traffic to the repair path as quickly as possible. Consequently, the repair tunnel 18 used must be provisioned beforehand in anticipation of the failure. Since the location of the repair tunnels is dynamically determined, it is useful to establish the repair tunnels without management action. Multiple repairs may share a tunnel end point.

Although not shown in FIG. 2, if link 16F were to fail, source node 12S can similarly use another tunnel that traverses the path 12E, 12D, 12C using the LDP labels advertised by label map messages 20 between these nodes, for forwarding traffic to nodes 12B or 12A via the other tunnel.

Figure 3:
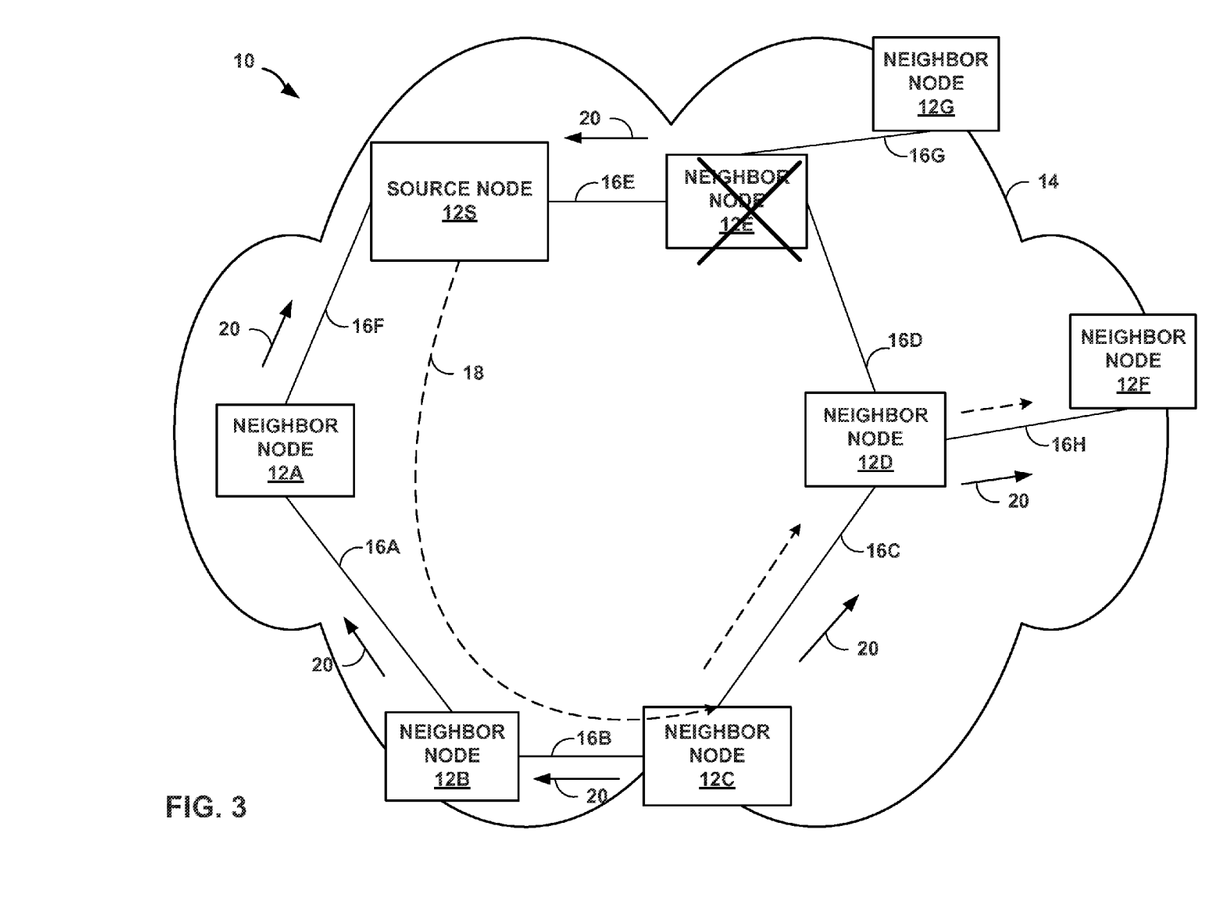
FIG. 3 is a block diagram illustrating an example network having network devices configured to employ the techniques described herein.

FIG. 3 is a block diagram illustrating the example network 14 of FIG. 1 having network devices configured to employ the techniques described herein in the case of a node failure. In the example of FIG. 3, neighbor node 12E has failed. In this case, neighbor node 12C provides node protection for traffic being forwarded to a destination of node 12D or node 12F, but not to node 12E or node 12G. Forwarded traffic flows on the dashed lines in FIG. 3.

This disclosure describes a procedure for ensuring node-protection with Remote-LFA. That is, a computing network device can select a remote LFA next hop that provides node protection. The same procedure is also extended for collection of the complete set of path attributes, enabling more accurate policy-based election between alternate paths obtained with Remote-LFA.

Nodes 12 of network 14 may be configured to compute the loop-free alternate (LFA) next hops in a computationally efficient matter, as described herein. The process for computing the remote LFA next hops is described in further detail below. In examples where node-protection is required on the primary next hop link, the process eliminates those PQ nodes that do not provide node-protection. This document proposes an additional forward SPF computation for each of the PQ-nodes, as a mechanism to provide node-protection with remote LFA. The techniques of this disclosure also provide a means for the computing router to collect complete path attributes for the alternate path via a Remote-LFA next hop to a given destination. This can be used by an alternate selection policy, if one has been configured.

The additional forward SPF computation for each PQ-node helps the computing router to determine whether a given primary next hop node is on the shortest path from a given PQ-node to any given destination. For a given PQ-node to provide a node-protecting alternate for a given destination, the primary next hop node should not be on any of the shortest paths from the given PQ-node to the given destination.

In the topology shown in FIG. 1, for all (non-ECMP) destinations reachable via the S-E link 16E, there is no standard LFA alternate. The Remote-LFA computation identifies node 12C as the PQ-node for the link 16E that provides a link-protecting next hop for all the destinations. Table 1 below shows all possible primary and Remote-LFA alternate paths for each destination.

TABLE 1

| Destination | Primary Path | Remote-LFA Backup Path |
|---|---|---|
| 12D | 12S → 12E → 12D | 12S → 12A → 12 → 12C → 12D |
| 12E | 12S → 12E | 12S → 12A → 12B → 12C → 12D → 12E |
| 12F | 12S → 12E → 12D → 12F | 12S → 12A → 12B → 12C → 12D → 12F |
| 12G | 12S → 12E → 12G | 12S → 12A → 12B → 12C → 12D → 12E → 12G |

Table 1 illustrates backup paths with Remote-LFA. A closer look at Table 1 shows that, while the PQ-node 12C provides link-protection for all the destinations, nod 12C does not provide node protection for destinations node 12E and node 12G. In the event of the node-failure on primary next hop E, the alternate path from Remote-LFA next hop node 12C to node 12E and 12G also becomes unavailable. So, for a Remote-LFA next hop to provide node-protection for a given destination, the shortest path from the given PQ-node to the given destination must not traverse the primary next hop.

Table 2 below provides an illustration of the mechanism with the topology in FIG. 1.

TABLE 2

| Destination | PQ-node | Shortest Path (PQ-node to Dest) | Link-Protection? | Node Protection? |
|---|---|---|---|---|
| 12D | 12C | 12C → 12D | Yes | Yes |
| 12E | 12C | 12C → 12D → 12E | Yes | No |
| 12F | 12C | 12C → 12D → 12E → 12F | Yes | No |
| 12G | 12C | 12C → 12D → 12E | Yes | Yes |

Table 2 illustrates types of protection with Remote-LFA. As seen in the above example, while neighbor node 12C is node-protecting Remote-LFA next hop for node 12D and node 12F, it is not so for node 12E and node 12G, since the primary next hop node 12E is in the shortest path from node 12C to node 12E and node 12G.

The techniques of this disclosure propose a process that identifies PQ nodes that do provide node protection for all destinations, and identifies those PQ nodes that do not. In this process, the computing router will compute an extra forward SPF for each of the PQ-nodes. Hence, the number of additional SPFs required in the proposed mechanism in this document may be considerably less compared to other approaches, such as approaches that require an extra reverse SPF computation for each next hop of the computing router, and imply less computational overhead. This can be seen upon considering some of the standard IGP network topologies in real-life service-provider deployments, where the number of next hops will be substantially higher than the number of PQ-nodes discovered in those topologies.

The additional forward SPF for each PQ-node, as proposed in this disclosure, also facilitates a means to collect the path characteristics for the alternate path segment from the PQ-node to the destination. The techniques of this disclosure propose to run an extra SPF rooted on each PQ-node discovered in the whole network. In this manner, the computing router can identify PQ nodes that provide node protection, and can also collect path characteristics for the path segment from the PQ node to the destination, which can be used for making policy-based selections between more than one potential PQ node when selecting the remote LFA next hop.

Figure 4:
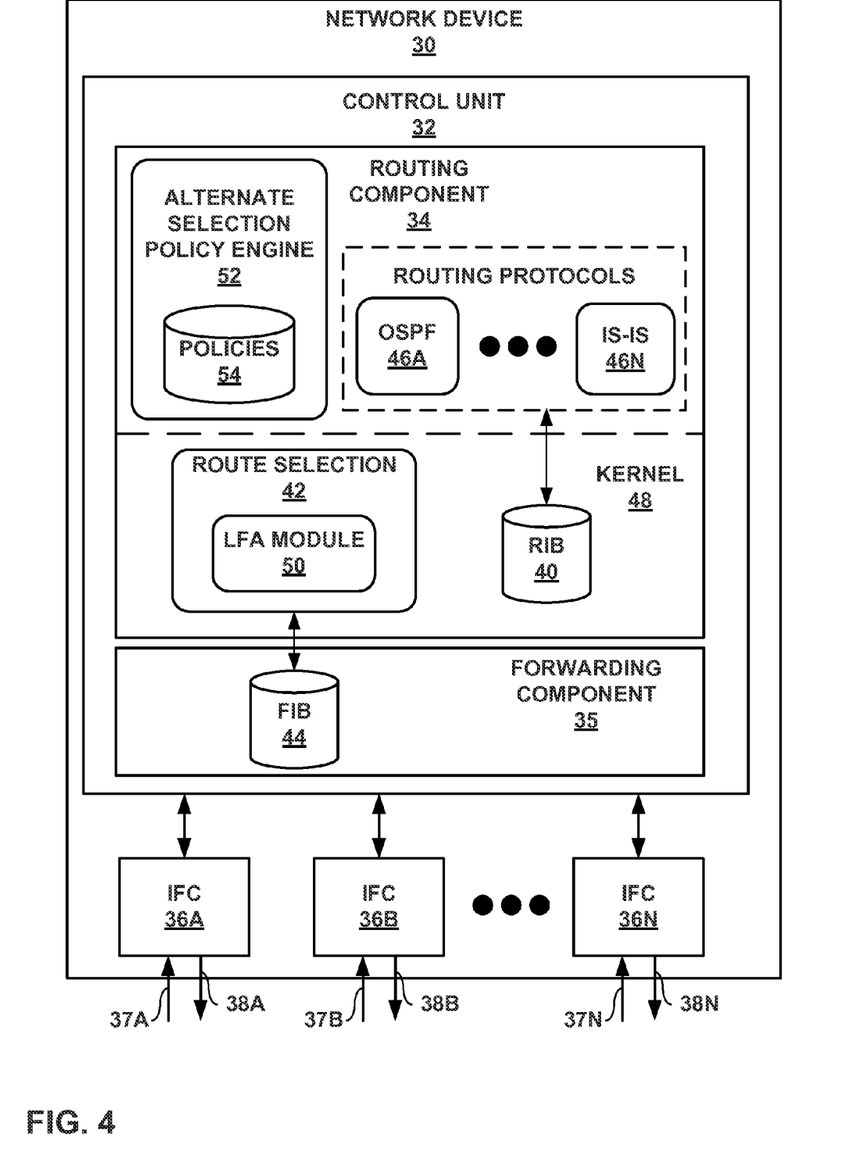
FIG. 4 is a block diagram illustrating an exemplary router having the R-LFA capability described herein.

FIG. 4 is a block diagram illustrating an exemplary network device 30 having the remote loop-free alternate (R-LFA) capability described herein. Network device 30 includes a control unit 32 that includes a routing component 34 coupled to a forwarding component 35. Network device 30 may be, for example, a router, or network device that incorporates routing functionality.

Routing component 34 provides an operating environment for routing protocols that perform routing operations to execute. Routing component 34 is responsible for the maintenance of a routing information base (RIB) 40 to reflect the current topology of a network and other network entities to which it is connected. In particular, routing component 34 periodically updates RIB 40 to accurately reflect the topology of the network and other entities. In accordance with RIB 40, forwarding component 35 maintains forwarding information base (FIB) 44 that associates network destinations with specific next hops and corresponding interface ports. For example, route selection module 42 analyzes RIB 40 and generates FIB 44 in accordance with RIB 40. Network device 30 includes interface cards 36A-36N ("IFCs 36") that receive packets via inbound links 37A-37N ("inbound links 37") and send packets via outbound links 38A-38N ("outbound links 38"). IFCs 36 are typically coupled to links 37, 38 via a number of interface ports (not shown).

Routing component 34 includes high-level, control plane routing protocols 46A-46N ("routing protocols 46"). Routing protocols 40 may be software processes executing on one or more processors. In the example of FIG. 4, routing protocols 46 include OSPF 46A and IS-IS 46N. Routing component 34 may include other routing protocols not shown in FIG. 4. Routing protocols 46 interact with kernel 48 to update RIB 40 based on routing protocol messages received by routing node 20. In response, route selection module 42 of kernel 48 generates forwarding information based on the network topology represented in RIB 40. Kernel 48 then programs forwarding component 35 to install the forwarding information as FIB 44.

Forwarding component 35 represents hardware and logic functions that provide high-speed forwarding of network traffic. Forwarding component 35 typically includes a set of one or more forwarding chips programmed with FIB 44 that maps network destinations with specific next hops and the corresponding output interface ports. In general, when network device 30 receives a packet via one of inbound links 37, forwarding component 35 identifies an associated next hop for the data packet by traversing FIB 44 based on information within the packet. Forwarding component 35 forwards the packet on one of outbound links 38 mapped to the corresponding next hop in accordance with FIB 44.

Route selection module 42 and LFA module 50 cooperate to select and install primary next hops and loop-free alternate (LFA) next hops to FIB 44. In some cases, where no regular LFAs exist, the LFA next hops will be remote LFA next hops. Route selection module 42 runs a Shortest Path First (SPF) calculation on the graph G representing network 14 with respect to network device 30 as the source S to compute a primary next hop to a given destination node in graph G. This SPF calculation is denoted SPF(S, G). Route selection module 42 may obtain information that makes up graph G from RIB 40.

Calculating SPF(S, G) allows route selection module 42 to obtain the optimal distance from source node 12S to all nodes 12 in the network 14 represented by graph G. This optimal distance is denoted by Distance_opt(S, D), and is also used as part of the computation of the LFA next hop or remote LFA next hop. Route selection module 42 selects the next hop having the optimal (e.g., lowest cost) distance as the primary next hop, and installs the selected primary next hop to FIB 44. Route selection module 42 installs the selected LFA next hop or remote LFA next hop into FIB 44 of forwarding component 35.

Some SPF implementations may produce a list of links and nodes traversed on the shortest path(s) from a given root to others. In such implementations, running a forward SPF rooted at a given PQ-node will produce a list of nodes (one per each destination), on one or more shortest path(s) from the PQ-node to other destinations in the network. To determine whether a PQ-node provides node-protection for a given destination, LFA module 50 can inspect the list of nodes computed from the forward SPF run on the PQ-node, for the given destination. In case the list contains the primary next hop node, LFA module 50 determines that the PQ-node does not provide node-protection. Else, LFA module 50 determines that the PQ-node guarantees node-protecting alternate for the given destination.

Alternatively, an implementation may also run the node-protection condition as shown in Inequality 1 below. Inequality 1 shows an example Node-Protection Condition for Remote-LFA. Any PQ-nodes that do not qualify the condition for a given destination do not guarantee node-protection for the destination.

$$D\_opt(Npq,Dst) < D\_opt(Npq,Np) + D\_opt(Np,Dst), \quad \text{(Inequality 1)}$$

where:

D_opt(X, Y): Distance on most optimum path from X to Y,

Npq: The PQ-node being considered,

Dst: The destination being protected, and

Np: The primary next hop node on shortest path from computing router to destination.

LFA module 50 can obtain all of the above metric costs, except D_opt(Npq, Dst), with forward and reverse SPFs with Np (the primary next hop) as the root, run as part of the regular LFA and Remote-LFA implementation. In accordance with the techniques of this disclosure, LFA module 50 can determine the Distance_opt(Npq, Dst) metric by running the additional forward SPF, with Npq(PQ-node) as the root.

Table 3 shows using Node-protecting condition for Remote-LFA. With reference to the topology in FIG. 1, Table 3 below shows how LFA module 50 can use the above condition of Inequality 1 to determine node-protection with a PQnode for remote LFA.

TABLE 3

| Destination (Dst) | Primary-NH (Np) | PQ-node (Npq) | D_OPT (Npq, Dst) | D_OPT (Npq, Np) | D_OPT (Np, Dst) | Condition Met? |
|---|---|---|---|---|---|---|
| 12D | 12E | 12C | 1 | 2 | 1 | Yes |
| 12E | 12E | 12C | 2 | 2 | 0 | No |
| 12F | 12E | 12C | 2 | 2 | 1 | Yes |
| 12G | 12E | 12C | 3 | 2 | 1 | No |

As seen in the above example above, node 12C does not meet the node protecting inequality for destination node 12E, and node 12F. And so, once again, while node 12C is a node-protecting Remote-LFA next hop for node 12D and node 12F, it is not so for node 12E and node 12G.

In this manner, for cases where node-protection is required on the primary nexthop link, LFA module 50 can determine whether a given Remote-LFA alternate provides node protection for a given destination or not. The technique does not find out any new Remote-LFA alternate next hops, outside the ones already computed by standard Remote-LFA procedure. However, in case of availability of more than one PQ-node (Remote-LFA alternates) for a destination, and node-protection is required for the given primary next hop, this procedure will allow LFA module 50 to eliminate the PQ-nodes that do not provide node protection and choose only the PQ-nodes that do provide node protection.

In some cases, network device 30 may be expected to find all possible (including all possible Remote-LFA) alternate next hops, collect the complete set of path characteristics for each alternate path, run an alternate selection policy (configured by the operator), and find the best alternate path. This will require the Remote-LFA implementation to gather all the required path characteristics along each link on the entire Remote-LFA alternate path. The techniques of this disclosure allow alternate selection policy engine 52 and LFA module 50 to perform policy-based selection of alternate paths that considers not only the path attributes from the computing router up until the PQ-node, but also allows for collection and consideration of path attributes of the path segment from the PQ node to the destination.

With the regular Remote-LFA functionality the LFA module 50 may compute more than one PQ-node as a usable candidate Remote-LFA alternate next hop. An administrator or operator may configure network device 30 with one or more policies 54, which may include an alternate selection policy to enable selection of one of several candidate remote LFA next hops as the most appropriate Remote-LFA alternate next hop. For such policy-based alternate selection to run, LFA module 50 needs to be able to collect all the relevant path characteristics for each the alternate paths (one through each of the PQ-nodes). The Remote-LFA alternate path through a given PQ-node to a given destination comprises of two path segments as follows: (1) Path segment from the computing router to the PQ-node (Remote-LFA alternate next hop), and (2) Path segment from the PQ-node to the destination being protected.

LFA module 50 can calculate the first path segment from the regular forward SPF done as part of standard and remote LFA computations. When performing the additional forward SPF computation according to the techniques of this disclosure, LFA module 50 can also collect links, nodes and path characteristics along the second path segment. This enables LFA module 50 to collect complete path characteristics for a given Remote-LFA alternate path to a given destination. The complete alternate path characteristics shall then facilitate more accurate alternate path selection by alternate selection policy engine 52 while running the alternate selection policy of policies 54. In the absence of the path characteristics for the second path segment that are obtained as described herein, alternate selection policy engine 52 may equally prefer two Remote-LFA alternate path based on the first path segments characteristics only, although the second path segment attributes may be different.

Alternate selection policy engine 52 can apply various example policies 54. For example, when multiple alternates exist, LFA module 50 may invoke alternate selection policy engine 52, which can apply a configured LFA selection algorithm is based on tie breakers, for example. Policy based decision may be based on multiple criterions, with each criteria having a level of preference. If the defined policy does not permit to determine a unique best LFA, alternate selection policy engine 52 may pick only one based on its own decision, as a default behavior. Alternate selection policy engine 52 may also support election of multiple LFAs, for load-balancing purposes.

A network operator or administrator may configure policies 54 by a user interface to network device 30. As one example, policies 54 may specify choosing the remote LFA next hop having a shortest path, i.e., lowest Interior Gateway Protocol (IGP) metric used to reach the destination. As another example, policies 54 may specify choosing the remote LFA next hop based on Shared Risk Link Group (SRLG), such as defined in A. Atlas, "Basic Specification for IP Fast Reroute: Loop-Free Alternates," Network Working Group, RFC 5286, September 2008, the entire contents of which are incorporated by reference herein. As a further example, policies 54 may specify choosing the remote LFA next hop based on downstreamness of a neighbor node. In some examples, preference of a downstream path over a non-downstream path may be configurable. In some examples, a preference based on link coloring may be configurable. In some examples, preference based on link Bandwidth, Neighbor preference, or other preference criteria may be configurable. Further considerations on policies are described in S. Litkowski, "Operational management of Loop Free Alternates," Routing Area Working Group, Internet-Draft, May 2013, the entire contents of which are incorporated by reference herein.

In operation, after LFA module 50 obtains a set of candidate remote LFA next hops, LFA module 50 may pass the set to alternate selection policy engine 52, which applies policies 54 to filter the candidate remote LFA next hops, and alternate selection policy engine 52 may prefer or de-prefer the paths for the candidate remote LFA next hops based on the policies. Alternate selection policy engine 52 may then pas the set of candidate remote LFA next hops back to LFA module 50 with the preferences indicated, and LFA module 50 selects a preferred remote LFA next hop to install to FIB 44.

The architecture of network device 30 illustrated in FIG. 4 is shown for exemplary purposes only. The disclosure is not limited to this architecture. In other embodiments, network device 30 may be configured in a variety of ways. In one embodiment, for example, some of the functionally of routing component 34 and forwarding component 35 may be distributed within IFCs 36.

Control unit 32 may be implemented solely in software, or hardware, or may be implemented as combinations of software, hardware, or firmware. For example, control unit 32 may include one or more processors which execute software instructions. In that case, the various software modules of control unit 32 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media.

Figure 5:
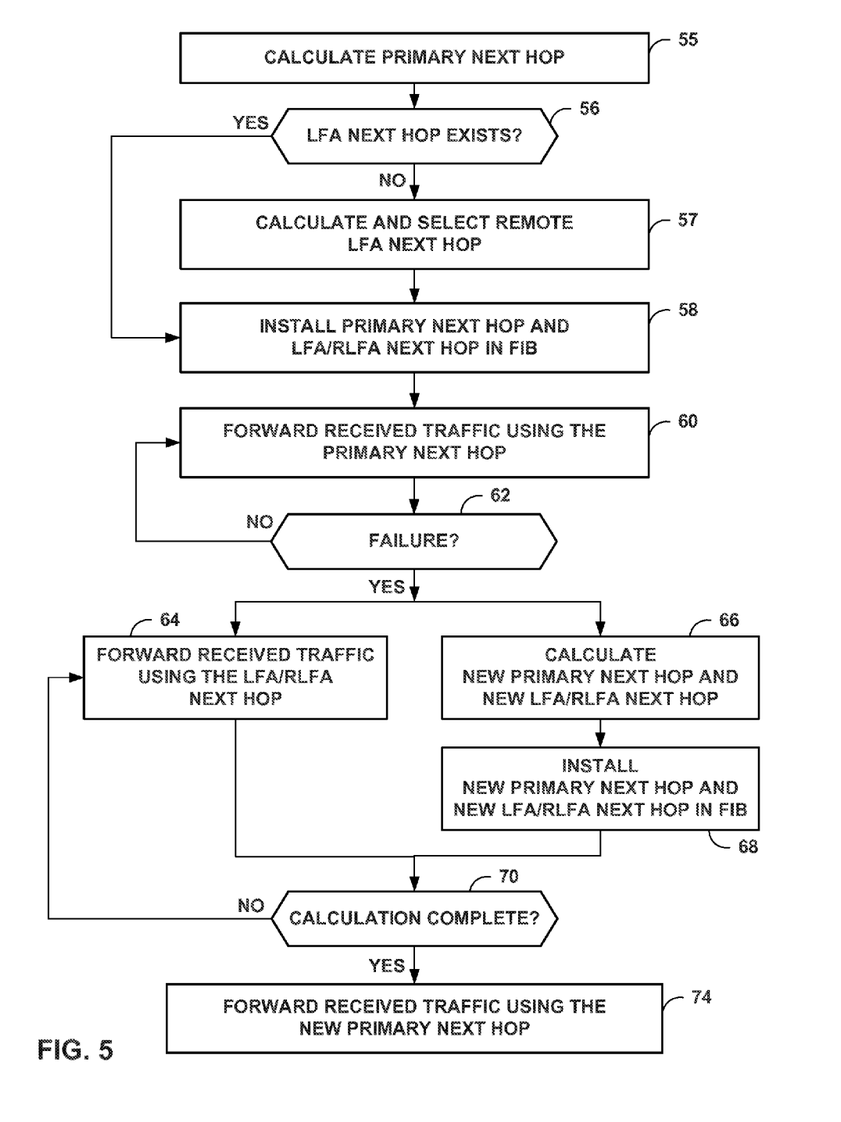
FIG. 5 is a flowchart illustrating an example mode of operation of one or more network devices in a network in using the techniques described herein.

FIG. 5 is a flowchart illustrating an example mode of operation of one or more network devices in a network in using the techniques described herein. The network device may be a router such as source node 12S of FIG. 1 or network device 30 of FIG. 4, and FIG. 5 is described for purposes of example by reference to these example devices. Each of network devices 12 may calculate primary next hops to be used to reach other network devices 12 in network 14 based on the link-state routing information in its respective RIB 40 (55). For example, LFA module 50 of source node 12S may select neighbor node 12E as the primary next hop for reaching neighbor node 12F. LFA module 50 of source node 12S may also select a loop-free alternate (LFA) next hop to use for reaching destination node 12F, for example, for use in the event of a failure associated with neighbor node 12E, if a LFA next hop exists (YES branch of 56), and install the LFA next hop in FIB 44 (58). If an LFA next hop does not exist (NO branch of 56), LFA module 50 calculates and selects a remote LFA next hop (57). As described in further detail below, where node-protection is required on the primary nexthop link, LFA module 50 calculates and selects the remote LFA next hop so as to provide node-protection if possible. LFA module 50 installs the primary next hops and the LFA next hop or remote LFA next hop in FIB 44 (58) for forwarding network traffic destined for the other nodes 12.

After the primary and alternate next hops are installed in forwarding information of source node 12S, and upon receiving packets destined for neighbor node 12F, source node 12S will forward the packets on link 16D to the primary next hop neighbor node 12E, in accordance with FIB 44 (60). Upon detecting that a failure condition has occurred for the primary next hop (62), source node 12S begins forwarding the received packets destined for destination node 12F using the LFA next hop or remote LFA (RLFA) next hop associated with destination node 12F, e.g., using neighbor node 12C (64). Also upon detecting the failure condition, source node 12S also begins calculating a new primary next hop and a new alternate next hop based on the changed network topology (66). After the new primary next hop and alternate next hop are calculated, source node 12S installs the primary next hop and alternate next hop in FIB 44 (68). After the calculation of the primary and LFA next hops are completed (70), source node 12S begins forwarding subsequently received packets using the new primary next hop (74).

Figure 6:
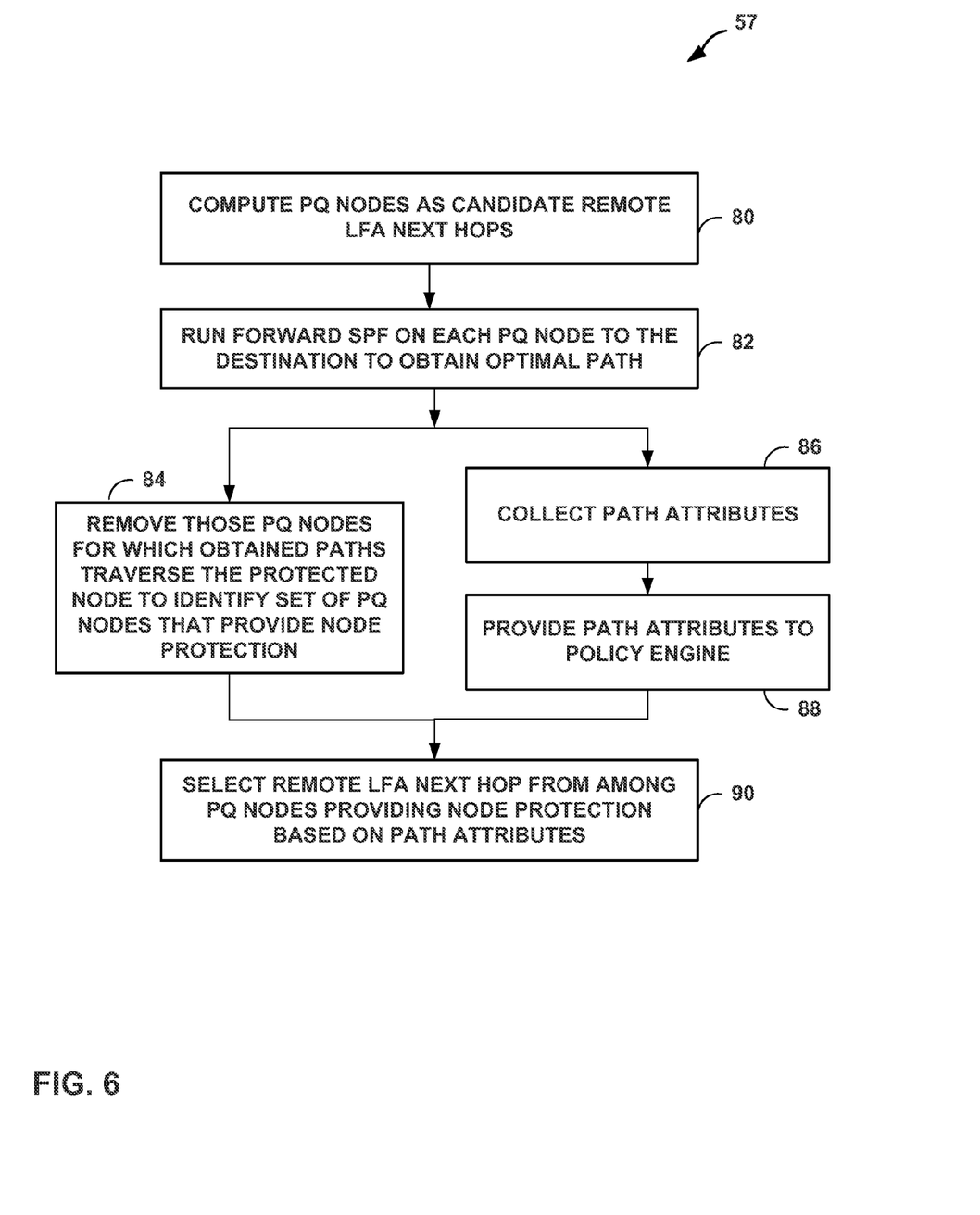
FIG. 6 is a flowchart illustrating an example mode of operation of one or more network devices in a network in using the techniques described herein.

FIG. 6 is a flowchart illustrating an example mode of operation of one or more network devices in a network in using the techniques described herein. The network device may be a router such as source node 12S of FIG. 1 or network device 30 of FIG. 4, and FIG. 6 is described for purposes of example by reference to these example devices. LFA module 50 of source node 12S computes the set of PQ nodes, and these are the initial set of candidate remote LFA next hops (80). LFA module 50 of source node 12S runs a forward SPF computation on each PQ node to the destination network device to obtain an optimal path from the PQ node to the destination network device (82). As LFA module 50 runs the forward SPF computation, LFA module 50 collects path attributes of these path segments (86) and may store them. In some cases, LFA module 50 provides the path attributes to alternate selection policy engine 52 (88). Prior to selecting the remote LFA next hop from the set of candidate remote LFA next hops, LFA module 50 also removes from the set of candidate remote LFA next hops those PQ nodes for which the obtained path traverses a protected node (84). In this manner, LFA module 50 identifies the set of PQ nodes that provide node protection.

In one example, LFA module 50 runs a forward SPF rooted at a given PQ-node so as to produce a list of nodes (one per each destination), on one or more shortest path(s) from the PQ-node to other destinations in the network. To determine whether a PQ-node provides node-protection for a given destination, LFA module 50 can inspect the list of nodes computed from the forward SPF run on the PQ-node, for the given destination. In case the list contains the primary next hop node, LFA module 50 determines that the PQ-node does not provide node-protection. Else, LFA module 50 determines that the PQ-node guarantees node-protecting alternate for the given destination.

In another example, prior to selecting the remote LFA next hop from the plurality of candidate remote LFA next hops, LFA module 50 of source node 12S removes from the set of candidate remote LFA next hops any candidate remote LFA next hops having distances on the most optimum path to the destination device that are not less than the sum of: (a) the distance on the most optimum path from (i) the respective candidate remote LFA next hop to the primary next hop node on the shortest path from the network device to (ii) the destination device; and (b) the distance on the most optimum path from (i) the primary next hop node on the shortest path from the network device to the destination device to (ii) the destination device. This is reflected in Inequality 1 described above. In this manner, LFA module 50 can identify the set of PQ nodes that provide node protection, in cases where node protection is required on the primary next hop link.

LFA module 50 then selects a remote LFA next hop from among the remaining set of PQ nodes providing node protection (90). If there are multiple PQ nodes remaining that provide node protection, LFA module 50 may invoke alternate selection policy engine 52 to select the remote LFA next hop based on the path attributes obtained during the forward SPF computations, in view of policies 54. In this manner, the techniques of this disclosure provide both node protection and full path attribute collection within the remote LFA next hop selection process.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
    by the network device, for each of a plurality of candidate remote loop-free alternate (LFA) next hops, performing a respective forward shortest path first (SPF) computation having the respective candidate remote LFA next hop as a root to compute a respective path segment between the respective candidate remote LFA next hop and a destination network device in a network, wherein each of the candidate remote LFA next hops comprises the tail-end node of a respective potential repair tunnel between the network device and the candidate remote LFA next hop for forwarding network traffic from the network device to the destination network device;
    determining, by the network device, whether each candidate remote LFA next hop provides node protection to a primary next hop node on a shortest path from the network device to the destination device by determining whether the primary next hop node is not on the respective path segment between the candidate remote LFA next hop and the destination network device;
    removing, by the network device, from the set of candidate remote LFA next hops any candidate remote LFA next hop for which the primary next hop node is on the respective path segment between the candidate remote LFA next hop and the destination network device to obtain an updated plurality of candidate remote LFA next hops;
    selecting, by the network device, a remote LFA next hop from the updated plurality of candidate remote LFA next hops to be stored as an alternate next hop for forwarding network traffic from the network device to the destination network device; and
    updating, by the network device, forwarding information stored by the network device to install the selected remote LFA next hop as the alternate next hop for forwarding network traffic from the network device to the destination network device.

2. The method of claim 1,
    wherein each of the candidate remote LFA next hops comprises a PQ node,
    wherein a PQ node comprises a network device that a member of both an extended P-space and a Q-space,
    wherein the Q-space comprises the set of network devices from which a specific network device can be reached without any path, including equal cost path splits, transiting a protected link, and
    wherein the extended P-space comprises the union of a P-space of the neighbors of a specific network device with respect to the protected link, where the P-space is the set of network devices reachable from a specific network device without any path, including equal cost path splits, transiting the protected link.

3. The method of claim 1,
    wherein removing from the set of candidate remote LFA next hops any candidate remote LFA next hop for which the primary next hop node is on the respective path segment between the candidate remote LFA next hop and the destination network device comprises prior to selecting the remote LFA next hop from the plurality of candidate remote LFA next hops, and by the network device, removing from the set of candidate remote LFA next hops any candidate remote LFA next hops having distances on the most optimum path to the destination device that are not less than the sum of: (a) the distance on the most optimum path from (i) the respective candidate remote LFA next hop to the primary next hop node on the shortest path from the network device to (ii) the destination device; and (b) the distance on the most optimum path from (i) the primary next hop node on the shortest path from the network device to the destination device to (ii) the destination device.

4. The method of claim 1, further comprising storing, by the network device, path attributes from the respective SPF computations, wherein the path attributes comprise path attributes of respective path segments between each of the plurality of candidate remote LFA next hops and the destination network device.

5. The method of claim 4, wherein the path attributes comprise attributes of one or more of links and nodes along the respective path segments between each of the plurality of candidate remote LFA next hops and the destination network device.

6. The method of claim 4, wherein selecting the remote LFA next hop comprises applying configured policies to the stored path attributes to select the remote LFA next hop from the plurality of candidate remote LFA next hops in accordance with the configured policies.

7. The method of claim 1, further comprising, by the network device, selecting a primary next hop to use in forwarding network traffic from the network device to the destination network device based on link-state routing information exchanged using a link-state routing protocol.

8. The method of claim 7, further comprising:
receiving network traffic destined for the destination; and
when the primary next hop is operational, forwarding the network traffic to the destination using the primary next hop; and
when the primary next hop is not operational, forwarding the network traffic to the destination using the remote LFA next hop.

9. The method of claim 7, further comprising installing the primary next hop in forwarding information of the network device for forwarding network traffic from the network device to the destination network device.

10. A network device comprising:
a control unit configured to execute a link-state routing protocol for exchanging link-state routing information to maintain network topology for a network;
a physical interface configured to send and receive link-state routing updates in accordance with the link-state routing protocol; and
a route selection module configured to, for each of a plurality of candidate remote loop-free alternate (LFA) next hops identified based on the network topology, perform a respective forward shortest path first (SPF) computation having the respective candidate remote LFA next hop as a root to compute a respective path segment between the respective candidate remote LFA next hop and a destination network device in the network, wherein each of the candidate remote LFA next hops comprises the tail-end node of a respective potential repair tunnel between the network device and the candidate remote LFA next hop for forwarding network traffic from the network device to the destination network device,
wherein the route selection module is configured to determine whether each candidate remote LFA next hop provides node protection to a primary next hop node on a shortest path from the network device to the destination device by determining whether the primary next hop node is not on the respective path segment between the candidate remote LFA next hop and the destination network device, and remove from the set of candidate remote LFA next hops any candidate remote LFA next hop for which the primary next hop node is on the respective path segment between the candidate remote LFA next hop and the destination network device to obtain an updated plurality of candidate remote LFA next hops,
wherein the route selection module is configured to select a remote LFA next hop from the plurality of candidate remote LFA next hops to be stored as an alternate next hop for forwarding network traffic from the network device to the destination network device, and
wherein the route selection module is configured to update forwarding information stored by the network device to install the selected remote LFA next hop as the alternate next hop for forwarding network traffic from the network device to the destination network device.

11. The network device of claim 10,
wherein each of the candidate remote LFA next hops comprises a PQ node,
wherein a PQ node comprises a network device that a member of both an extended P-space and a Q-space,
wherein the Q-space comprises the set of network devices from which a specific network device can be reached without any path, including equal cost path splits, transiting a protected link, and
wherein the extended P-space comprises the union of a P-space of the neighbors of a specific network device with respect to the protected link, where the P-space is the set of network devices reachable from a specific network device (S) without any path, including equal cost path splits, transiting the protected link.

12. The network device of claim 10,
wherein the configuration to determine whether each candidate remote LFA next hop provides node protection to the primary next hop node comprises configuration to, prior to selecting the remote LFA next hop from the plurality of candidate remote LFA next hops, remove from the set of candidate remote LFA next hops any candidate remote LFA next hops having distances on the most optimum path to the destination device that are not less than the sum of: (a) the distance on the most optimum path from (i) the respective candidate remote LFA next hop to the primary next hop node on the shortest path from the network device to (ii) the destination device; and (b) the distance on the most optimum path from (i) the primary next hop node on the shortest path from the network device to the destination device to (ii) the destination device.

13. The network device of claim 10, wherein the route selection module is configured to store path attributes of one or more of links and nodes along the respective path segments between each of the plurality of candidate remote LFA next hops and the destination network device.

14. The network device of claim 13, wherein the route selection module is configured to apply configured policies to the stored path attributes to select the remote LFA next hop from the plurality of candidate remote LFA next hops in accordance with the configured policies.

15. The network device of claim 10, wherein the route selection module is configured to select a primary next hop to use in forwarding network traffic from the network device to the destination network device based on link-state routing information exchanged using a link-state routing protocol.

16. The network device of claim 15, further comprising:
a forwarding component to receive network traffic destined for the destination,
wherein when the primary next hop is operational, the forwarding component forwards the network traffic to the destination using the primary next hop; and
wherein when the primary next hop is not operational, the forwarding component forwards the network traffic to the destination using the remote LFA next hop.

17. The network device of claim 15, wherein the route selection module is configured to install the primary next hop in forwarding information of the network device for forwarding network traffic from the network device to the destination network device.

18. A non-transitory computer-readable storage medium comprising instructions for causing a programmable processor of a network device to:
for each of a plurality of candidate remote loop-free alternate (LFA) next hops, perform a respective forward shortest path first (SPF) computation having the respective candidate remote LFA next hop as a root to compute a respective path segment between the respective candidate remote LFA next hop and a destination network device in a network, wherein each of the candidate remote LFA next hops comprises the tail-end node of a respective potential repair tunnel between the network device and the candidate remote LFA next hop for forwarding network traffic from the network device to the destination network device;

determine whether each candidate remote LFA next hop provides node protection to a primary next hop node on a shortest path from the network device to the destination device by determining whether the primary next hop node is not on the respective path segment between the candidate remote LFA next hop and the destination network device;

remove from the set of candidate remote LFA next hops any candidate remote LFA next hop for which the primary next hop node is on the respective path segment between the candidate remote LFA next hop and the destination network device to obtain an updated plurality of candidate remote LFA next hops;

select a remote LFA next hop from the updated plurality of candidate remote LFA next hops to be stored as an alternate next hop for forwarding network traffic from the network device to the destination network device; and update forwarding information stored by the network device to install the selected remote LFA next hop as the alternate next hop for forwarding network traffic from the network device to the destination network device.

* * * * *